No. 710,087. Patented Sept. 30, 1902.
W. W. TUCK & A. WASSMANN.
FEED CONTROLLING MECHANISM FOR HYDROCARBON MOTORS.
(Application filed Oct. 15, 1901.)
(No Model.) 6 Sheets—Sheet 1.

Witnesses:
D. W. Gardner.
John Kirn

Inventors:
William W. Tuck
August Wassmann
By their Attorney
Geo. Wm. Miatt

No. 710,087. Patented Sept. 30, 1902.
W. W. TUCK & A. WASSMANN.
FEED CONTROLLING MECHANISM FOR HYDROCARBON MOTORS.
(Application filed Oct. 15, 1901.)
(No Model.) 6 Sheets—Sheet 3.

Witnesses.
D. W. Gardner.
John Kirn.

Inventors:
William W. Tuck
August Wassmann
By their Attorney
Geo. Wm. Miatt

No. 710,087. Patented Sept. 30, 1902.
W. W. TUCK & A. WASSMANN.
FEED CONTROLLING MECHANISM FOR HYDROCARBON MOTORS.
(Application filed Oct. 15, 1901.)
(No Model.)
6 Sheets—Sheet 4.

Witnesses:
Inventors:
William W. Tuck
August Wassmann
By their Attorney

No. 710,087. Patented Sept. 30, 1902.
W. W. TUCK & A. WASSMANN.
FEED CONTROLLING MECHANISM FOR HYDROCARBON MOTORS.
(Application filed Oct. 15, 1901.)
(No Model.) 6 Sheets—Sheet 5.

UNITED STATES PATENT OFFICE.

WILLIAM W. TUCK, OF RICHMOND HILL, AND AUGUST WASSMANN, OF ASTORIA, NEW YORK.

FEED-CONTROLLING MECHANISM FOR HYDROCARBON-MOTORS.

SPECIFICATION forming part of Letters Patent No. 710,087, dated September 30, 1902.

Application filed October 15, 1901. Serial No. 78,675. (No model.)

*To all whom it may concern:*

Be it known that we, WILLIAM W. TUCK, residing at Richmond Hill, and AUGUST WASSMANN, residing at Hallets Point, Astoria, Queens county, and State of New York, citizens of the United States, have invented certain new and useful Improvements in Feed-Controlling Mechanism for Hydrocarbon-Motors, of which the following is a specification sufficient to enable others skilled in the art to which the invention appertains to make and use the same.

Our improvements relate to mechanism for regulating and controlling the feed-supply of hydrocarbon fuel to motors of the class in which combustion of the vaporized hydrocarbon and the expansion of the gases generated thereby are utilized against a reciprocating piston.

The object of our invention is to render the feed-controlling mechanism more delicate and sensitive in operation as well as more rapid and accurate in adjustment, and also to provide for its control by hand as well as by means of an automatic governor.

The invention consists in the special arrangement of parts herein described and claimed, although we do not confine ourselves to the identical structure shown, since various modifications and mechanical expedients may be resorted to without departing from the spirit and intent of our invention.

Figure 1:
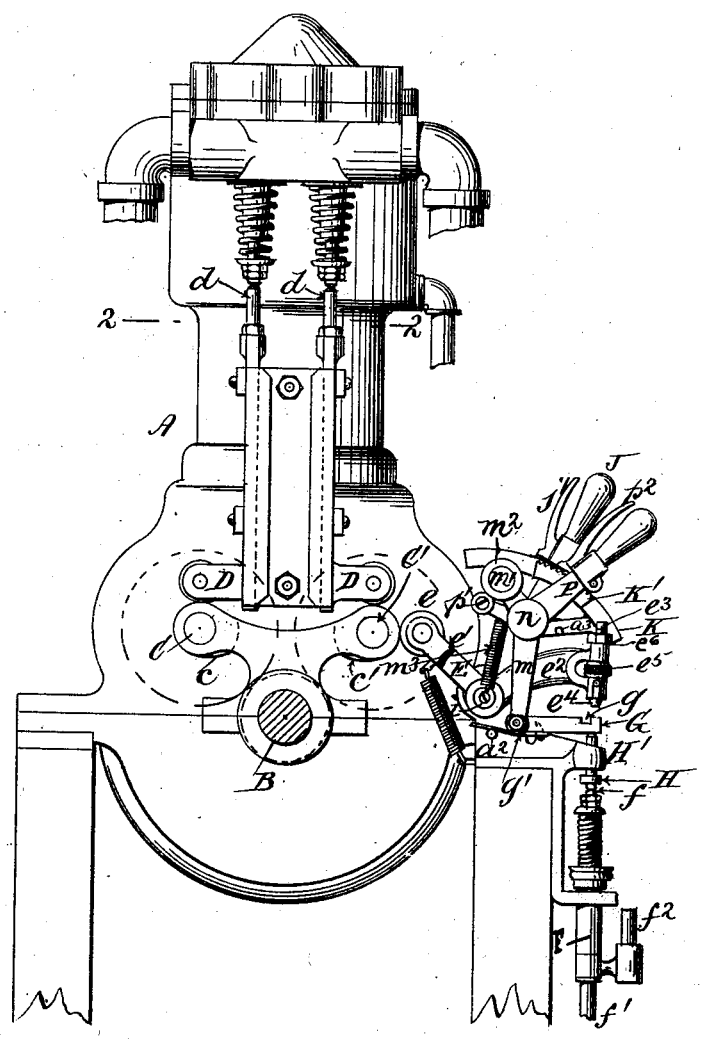
Figure 2:
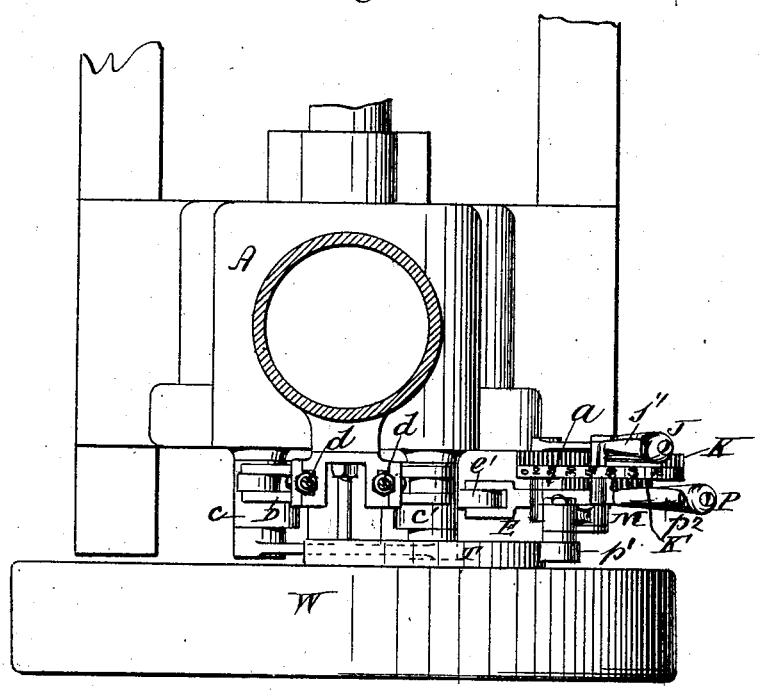
Figures 3, 3A:
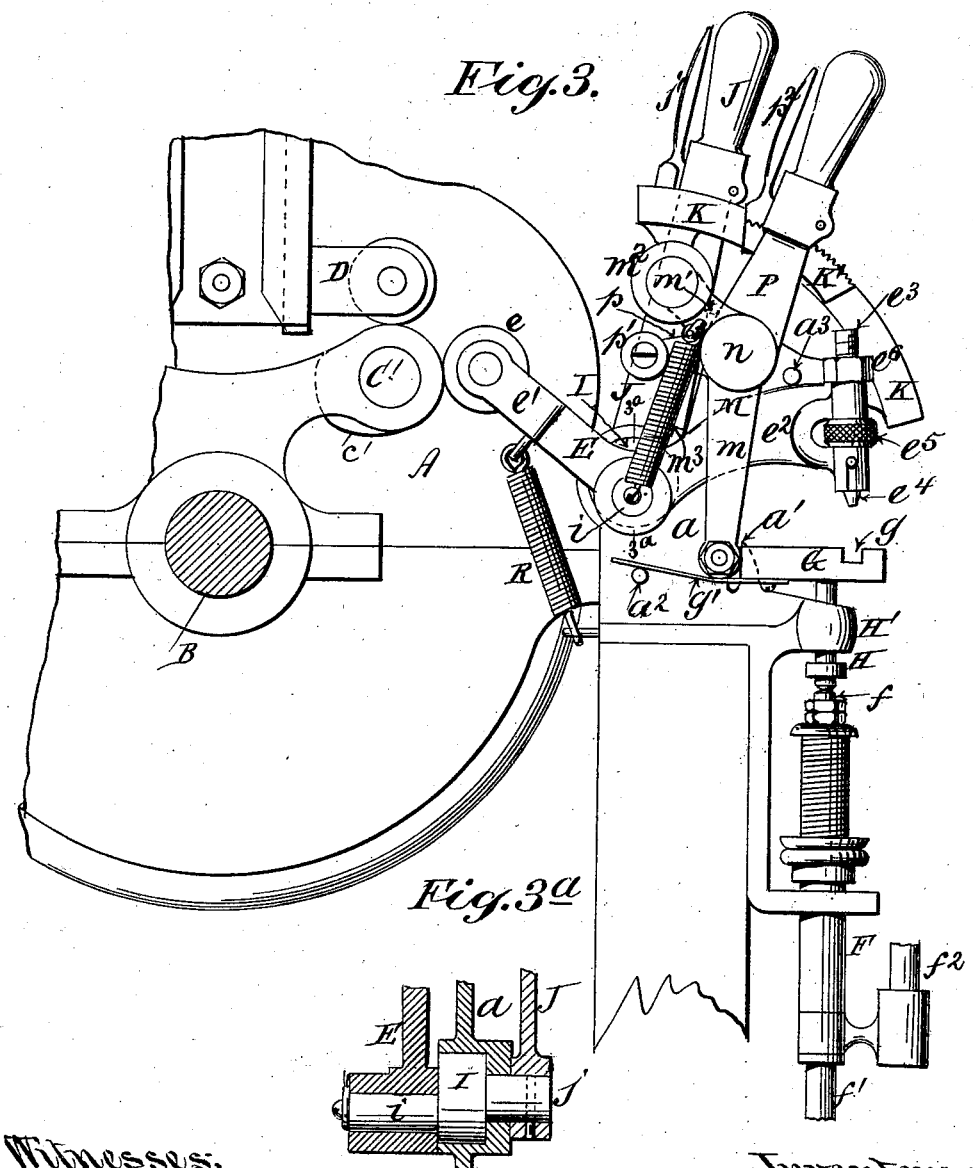
Figure 4:
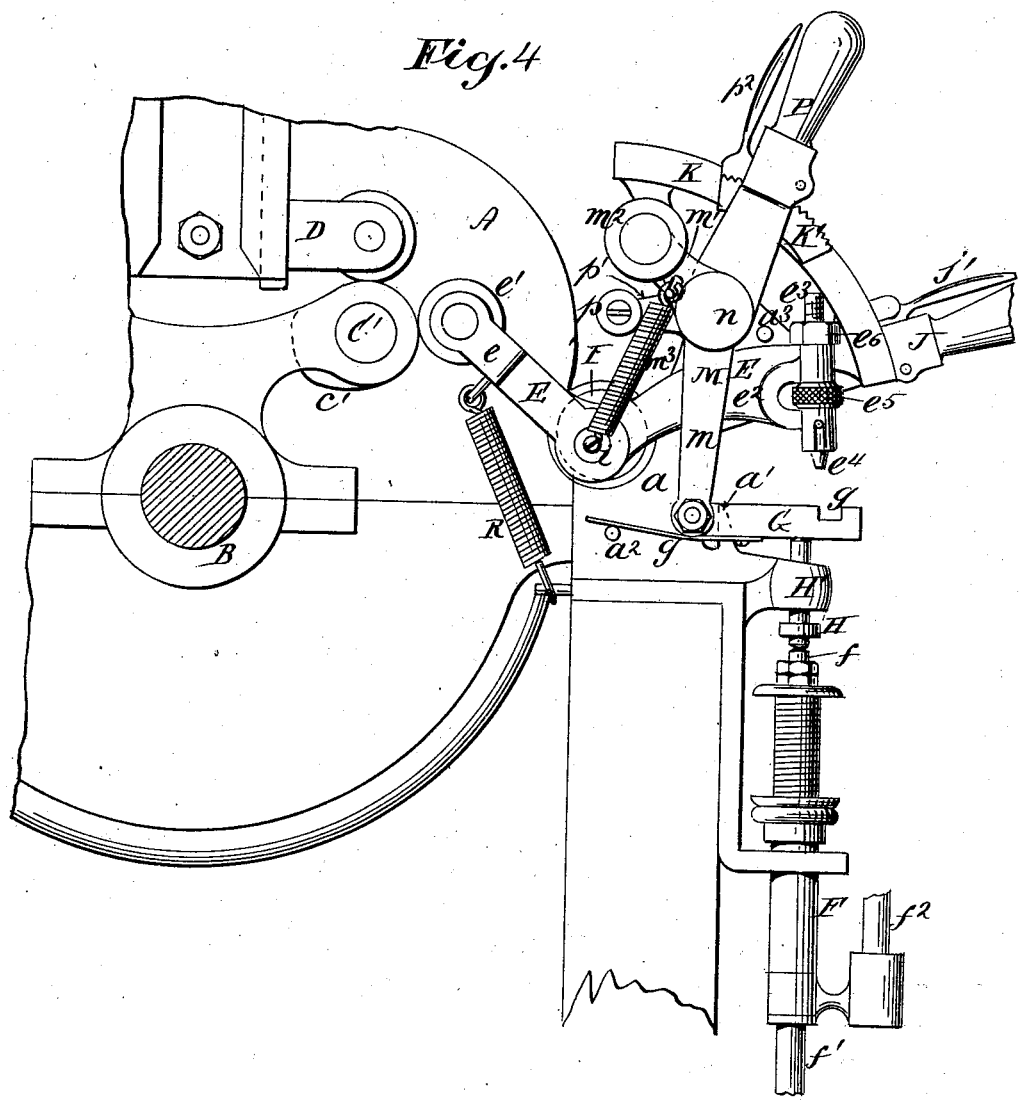
Figure 5:
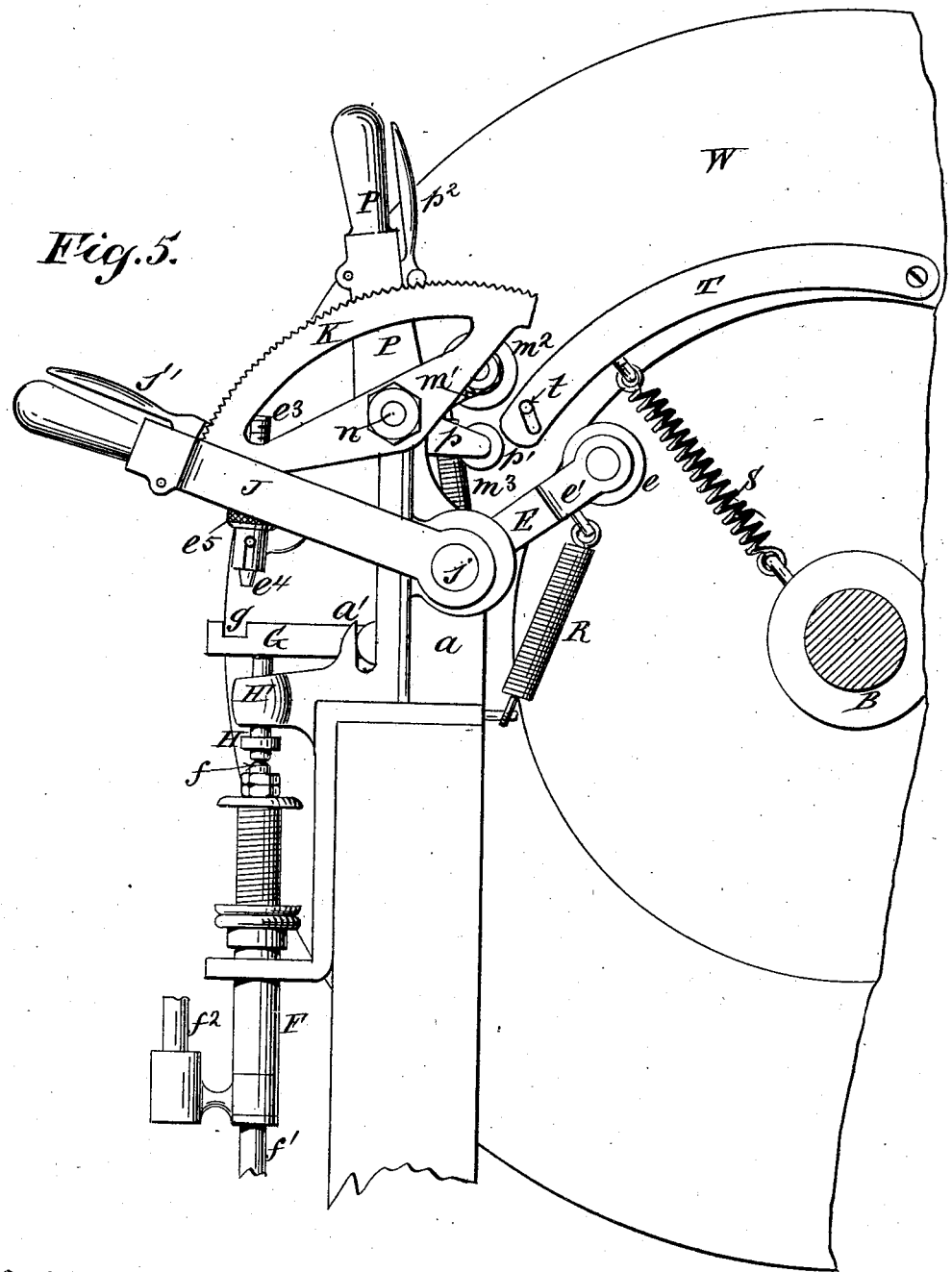
Figure 6:
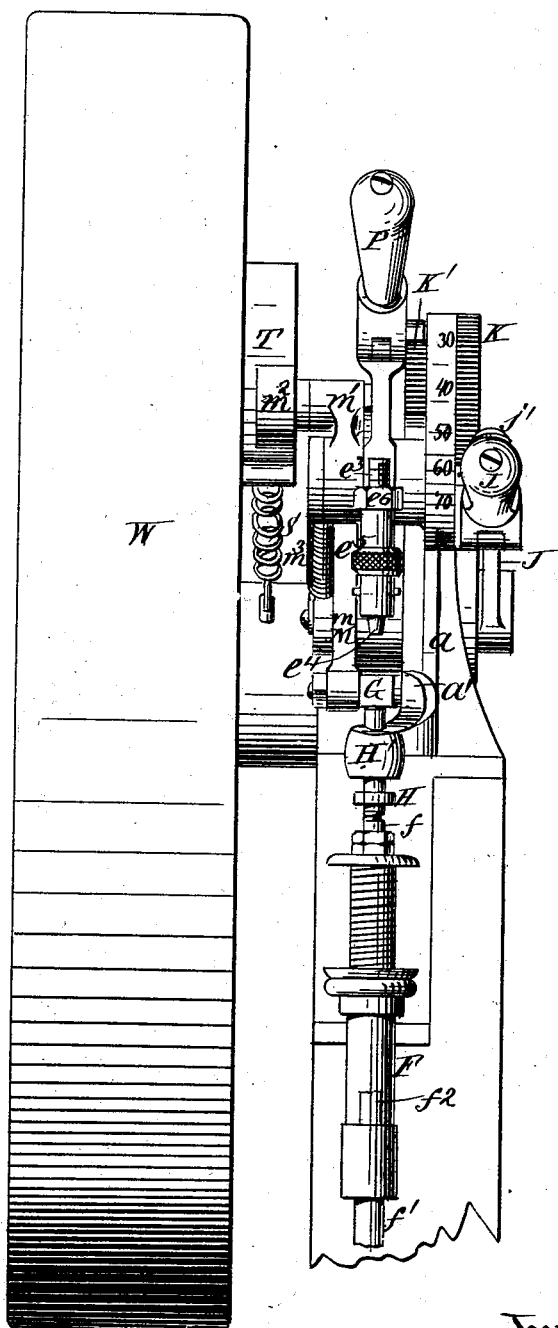

In the accompanying drawings, Figure 1 is an elevation showing the relation of our feed-regulating mechanism to a kerosene-engine. Fig. 2 is a horizontal section upon plane of line 2 2, Fig. 1, showing a plan of the feed-controlling mechanism and of the fly-wheel upon which the centrifugal governor is situated. Fig. 3 is a sectional elevation, upon an enlarged scale, showing the feed mechanism thrown out of action. Fig. 3$^a$ is a detail section upon plane of line 3$^a$ 3$^a$, Fig. 3; Fig. 4, a view similar to Fig. 3, showing the feed mechanism adjusted to afford the maximum degree of feed. Fig. 5 is a view of the parts in the same position taken from the side opposite to that shown in Fig. 4 and showing the governor and a portion of the fly-wheel in elevation. Fig. 6 is an elevation taken at right angles to Fig. 4.

A represents the engine and framework generally.

B is the crank-shaft, on which is situated a pinion meshing with two gears, as seen in Fig. 1, one on each of the cam-shafts C C', said pinion and gears being within the casing, and therefore not shown. The cam-shafts are timed to rotate once for every two rotations of the crank-shaft B, so that their cams $c$ $c'$ are brought into action during every second complete reciprocation of the piston, first acting upon the cross-head D, carrying the rods $d$ $d$, by which the exhaust and air valves are opened, after which the cam $c'$ comes in contact with the roller $e$ upon the end of the inner arm $e'$ of the rock-lever E, the outer arm $e^2$ of which acts indirectly upon the piston-rod $f$ of the oil-pump F through the medium of the controlling-slide G and follower H.

$f'$ is the supply-pipe for conducting kerosene or other hydrocarbon to the pump.

$f^2$ is the feed-pipe connecting with the injector, by which the fuel is introduced into the combustion-chamber in the usual and well-known manner. The follower H simply rests loosely upon the end of the pump-rod $f$, being held and maintained in position by the bracket H', through which it passes.

The rod $e^3$, upon which the contact-point $e^4$ is formed, is adjustable upon the end of the outer arm $e^2$ of the rock-lever E for the purpose of setting said point $e^4$ accurately with relation to the controller-slide G. This may be accomplished, as shown in the drawings, by threading said rod $e^3$ for engagement with an adjusting-nut $e^5$ and lock-nut $e^6$. The rock-lever E is fulcrumed on a stud $i$ upon the eccentric I, boxed in the frame and having the lower end of the lever J secured to its opposite side. As a result the fulcrum of the lever E may be adjusted within certain limits with relation to the center of the cam-shaft C', thereby varying the stroke of the contact-point $e^4$, as hereinafter set forth. A coil-spring R, secured to a stationary part of the frame and to the inner arm $e'$ of the lever E, tends constantly to throw the outer arm $e^2$ upward against a suitable stop $a^3$.

The lever J is provided with a pawl $j'$, which engages with the teeth upon the periphery of the segment K for the purpose of holding the shaft $j$ and eccentric I positively in position.

The controlling-slide G is pivoted at its inner end to the lower arm $m$ of the rock-lever M, pivotally supported upon the bracket $a$, in which the eccentric I is boxed. The other arm $m'$ carries a roller $m^2$. A coil-spring $m^3$, secured to the arm $m'$ at one extremity and to the stud $i$ or other convenient point of attachment at the other, tends constantly to throw the lower end of the arm $m$ into contact with the stop $a'$ upon the bracket $a$. A flat metal spring $g'$ is secured to the under side of the controlling-slide G and extends backward over the stud $a^2$, so that it tends constantly to press the controlling-slide G downward against the upper end of the follower H. The controller-slide G is formed with a recess $g$ upon its upper side, into which the contact-point $e^4$ enters when said slide is drawn inward sufficiently for the purpose of cutting off the oil-supply.

Upon the same stationary shaft $n$ upon which the lever M is mounted is also fulcrumed the hand-lever P, the shorter arm $p$ of which carries the roller $p'$ for contact with the roller $m^2$ upon the inner end $m'$ of the lever M when it is desired to adjust the controlling-slide G by hand. The lever P is provided with a hand-pawl $p^2$ for engagement with the segmental rack K', attached to the segmental rack K or to other stationary support.

Upon the inner face of the fly-wheel W is pivoted a tangential segment T, the motion of which is limited by a pin $t$, said tangential segment being drawn inward by a coil-spring S under normal conditions, but yielding under centrifugal force sufficiently to protrude into the path of the roller $m^2$ upon the rock-lever M whenever the speed of the engine is sufficiently great.

It will be seen that by our arrangement the controlling-slide G is adapted to be regulated in position by hand as well as automatically by the governor. Thus by means of the hand-lever P and segmental rack K' the roller $p'$, acting on the roller $m^2$ on the rock-lever M, may be made to retract the controlling-slide G more or less against the resistance of the coiled spring $m^3$ to decrease or even cut off the supply of oil, since the farther the pivotal point or fulcrum of the controlling-slide G is retracted from the path of the contact-point $e^4$ the less the thrust of the latter will depress the pump-rod until the recess $g$ is reached, when the stroke of the contact-point will fail to operate the pump. Again, the effective stroke of the contact-point $e^4$ may be varied by changing the position of the fulcrum-stud $i$, upon which the rock-lever E is mounted, with relation to the center of the cam C' by means of the lever J. If the stud $i$ is thrown over toward the cam C', the thrust of the latter will depress the contact-point $e^4$ to a greater extent, and thereby cause an increased feed of oil, whereas if, on the contrary, the stud $i$ is moved by the lever J in the opposite direction the contact-point will have less effective thrust and less oil will be injected into the ignition-chamber. Consequently if the maximum degree of feed and speed is required the lever J is drawn over to the fullest extent and the lever P is adjusted to hold the roller $p'$ out of contact with the roller $m^2$, as shown in the drawings, under which conditions the maximum stroke and feed will be attained.

If the speed attained exceeds a certain limit, the governor-segment T will be thrown out by centrifugal force until it comes in contact with the roller $m^2$ at each rotation, thereby retracting the controlling-slide G more or less and modifying the effective stroke of the contact-point $e^4$ until finally if the speed attained is excessive the governor-segment will protrude sufficiently to retract the controlling-slide G until the recess $g$ is brought under the contact-point $e^4$ and the pump will cease to act. The same result may be attained independently and at any speed of running by means of the lever P acting through its roller $p'$ against the roller on the lever M to rock the latter and retract the controlling-slide G more or less. In this connection it is to be noted that we do not confine ourselves to the use of rollers upon the levers, since they may obviously be omitted without materially affecting the operation of the mechanism.

In Fig. 3 the parts are shown as set to throw the pump out of action by means of the lever J, which is thrown back so far to carry the pivotal stud $i$ forward the distance necessary to bring the contact-point over the notch $g$ in the controlling-slide G, and thereby render the thrust of said contact-point ineffective.

In Fig. 1 the lever P is shown as brought so far forward as to retract the controlling-slide $g$ sufficiently to bring the notch $g$ past the path of the contact-point $e^4$, so that the latter will strike the controlling-slide beyond said notch $g$, while the roller $m^2$ is withdrawn beyond the reach of the governor-segment T upon the fly-wheel, thus admitting of the engine running to the full limit of its capacity.

By our improved construction and arrangement of parts we are enabled to vary and control the speed of the engine with accuracy and convenience. Our controlling apparatus may be set to run automatically or may be operated directly by hand, or a modification of both methods may be adopted.

It is to be understood that by shifting the fulcrum of the lever E inward or outward the time of the feed may be changed within certain limits as related to the stroke of the piston as may be found most expedient in running the engine.

What we claim as our invention, and desire to secure by Letters Patent, is—

1. In feed-controlling mechanism for hydrocarbon-motors, the combination of the flywheel W, of the engine, the tangential segment T, pivotally connected thereto, and actuated by centrifugal force, the rock-lever M, adapted for contact with said tangential segment T, at one end and having the controlling-slide G, pivotally connected at its outer end, said controlling-slide G, formed with the recess $g$, and resting upon the oil-pump piston-rod, the rock-lever E, carrying the contact-point $e^4$, at its outer extremity, adapted for contact with the cam $c'$ at its inner extremity, said cam $c'$, actuated indirectly by the crank-shaft, spring R, for throwing the inner end of said rock-lever E, in contact with said cam, and a stop for limiting the upward thrust of the outer arm $e^2$, of said lever for the purpose set forth.

2. In feed-controlling mechanism for hydrocarbon-motors, the combination of the flywheel W, of the engine, the tangential segment T, pivotally connected thereto and actuated by centrifugal force, the rock-lever M, carrying the roller $m'$, upon its upper end for contact with the tangential segment T, and pivotally connected at its other end to the controlling-slide G, a stop $a'$ for limiting the motion of said lower arm $m$, of the rock-lever M, the coil-spring $m^3$, which tends constantly to force said lever against said stop $a'$, said controlling-slide G, resting upon the oil-pump piston-rod, and formed with the recess $g$, and with the spring $g'$, resting against a stop $a^2$ the rocking lever E, provided with the contact-roller $e$, at its inner end and carrying the contact-point $e^4$, at its lower end, a spring for throwing the rock-lever E, into contact with the cam $c'$, said cam $c'$, actuated indirectly by the crank-shaft for the purpose and substantially in the manner set forth.

3. In feed-controlling mechanism for hydrocarbon-motors, the combination of the flywheel W, of the engine, the tangential segment T, pivotally connected thereto and actuated by centrifugal force, the rock-lever M, carrying the contact-roller $m^2$, at one end and the controlling-slide G, at the other, said controlling-slide G, resting upon the oil-pump piston-rod, and formed with the recess $g$, the rock-lever E, fulcrumed upon the stud $i$, upon the eccentric I, and carrying the contact-roller $e$, at its inner end and the contact-point $e^4$, at its outer end, means for thrusting said rock-lever E, in contact with the cam $c'$, said cam $c'$, actuated indirectly by the crank-shaft, the lever J, rigidly connected to the eccentric I, and provided with the hand-pawl $j'$, and the segmental rack K, the whole arranged and operating substantially in the manner and for the purpose set forth.

4. In feed mechanism for controlling hydrocarbon-motors, the combination of the flywheel W, of the engine, the tangential segment T, pivotally connected thereto and actuated by centrifugal force, the rock-lever M, carrying the roller $m^2$, for contact with said segment T, at one extremity and the controlling-slide G, at the other extremity, said controlling-slide resting upon the oil-pump piston-rod, and formed with the recess $g$, of the rock-lever E, provided with the contact-roller $e$, at its inner end for engagement with the cam $c'$, actuated indirectly by the crank-shaft, and the rock-lever P, carrying the contact-roller $p'$, at its inner end for engagement with the roller $m^2$, upon the rock-lever M, for the purpose set forth.

5. In feed-controlling mechanism for hydrocarbon-motors, the combination of the flywheel W, of the engine, the tangential segment T, pivotally connected thereto, and actuated by centrifugal force, the rock-lever M, carrying the roller $m^2$, for contact with said segment T, at one extremity and the controlling-slide G, at the other extremity, said controlling-slide G, resting upon the oil-pump piston-rod and formed with the recess $g$, the rock-lever E, provided with the contact-roller $e$, at its inner end for engagement with the cam $c'$, actuated indirectly by the crank-shaft, the rock-lever P, carrying the contact-roller $p'$, at its inner end for engagement with the roller $m^2$, upon the rock-lever M, a hand-pawl $p^2$, on the lever J, and the segmental rack K', the whole arranged and operating substantially in the manner and for the purpose set forth.

6. In feed-controlling mechanism for hydrocarbon-motors, the combination of the flywheel W, of the engine, the tangential segment T, pivotally connected thereto and actuated by centrifugal force, the rock-lever M, carrying the roller $m^2$, for contact with the said segment T, at one extremity, and the controlling-slide G, at the other extremity, said controlling-slide G, resting upon the oil-pump piston-rod, and formed with the recess $g$, the rock-lever E, provided with the contact-roller $e$, at its inner end for engagement with the cam $c'$, and carrying the contact-point $e^4$, on its other extremity, said cam $c'$, actuated indirectly by the crank-shaft, the rock-lever P, carrying the contact-roller $p'$, at its inner end and provided with the hand-pawl $p^2$, the segmental rack K', the eccentric I, having the stud $i$, upon which the rock-lever E, is fulcrumed, and connected rigidly to a lever J, said lever J, provided with the hand-pawl $j'$, and the segmental rack K, the whole arranged and operating substantially in the manner and for the purpose described.

WILLIAM W. TUCK.
AUGUST WASSMANN.

Witnesses:
D. W. GARDNER,
JOHN KIRN.